United States Patent [19]

Foss

[11] Patent Number: 5,635,673
[45] Date of Patent: Jun. 3, 1997

[54] CABLE JOINTING ENCLOSURE

[75] Inventor: Raymond C. Foss, Plymouth, United Kingdom

[73] Assignee: Bowthorpe plc, West Sussex, United Kingdom

[21] Appl. No.: 244,082

[22] PCT Filed: Nov. 16, 1992

[86] PCT No.: PCT/GB92/02123

§ 371 Date: Jun. 1, 1994

§ 102(e) Date: May 16, 1994

[87] PCT Pub. No.: WO93/10585

PCT Pub. Date: May 27, 1993

[30] Foreign Application Priority Data

Nov. 16, 1991 [GB] United Kingdom .................. 9124386

[51] Int. Cl.⁶ .............................................. H02G 3/18
[52] U.S. Cl. ............................ 174/65 R; 174/50; 220/3.8
[58] Field of Search ................... 220/3.2, 3.8; 174/52.2, 174/52.3, 58, 59, 65 R, 65 G, 50

[56] References Cited

U.S. PATENT DOCUMENTS

| | | | |
|---|---|---|---|
| 3,599,134 | 8/1971 | Galloway | 336/90 |
| 3,600,754 | 8/1971 | Vox | 18/26 RR |
| 3,910,448 | 10/1975 | Evans et al. | 220/3.8 |
| 4,202,457 | 5/1980 | Tansi | 220/3.3 |
| 4,304,957 | 12/1981 | Slater et al. | 174/65 R |
| 4,331,626 | 5/1982 | Colby | 264/310 |
| 4,384,368 | 5/1983 | Rosenfeldt et al. | 455/602 |
| 4,389,535 | 6/1983 | Slater et al. | 174/65 R |
| 4,399,020 | 8/1983 | Branchick et al. | 204/269 |
| 4,436,601 | 3/1984 | Branchick et al. | 204/149 |
| 4,449,015 | 5/1984 | Hotchkiss et al. | 174/138 F |
| 4,488,763 | 12/1984 | Ritter | 339/17 F |
| 4,623,753 | 11/1986 | Feldman et al. | 174/50 |
| 4,884,171 | 11/1989 | Maserang et al. | 361/424 |
| 4,962,440 | 10/1990 | Johnnerfelt et al. | 361/126 |
| 5,201,111 | 4/1993 | Prohaska | 29/596 |
| 5,206,796 | 4/1993 | Thompson et al. | 361/424 |
| 5,430,618 | 7/1995 | Huang | 361/818 |

*Primary Examiner*—Kristine L. Kincaid
*Assistant Examiner*—Dean A. Reichard
*Attorney, Agent, or Firm*—Edwin D. Schindler

[57] ABSTRACT

A cable jointing enclosure is disclosed, which includes a one-piece rectangular housing formed by rotational molding. The housing has an opening in its top. A metal cover plate acts to seal over the opening. The metal cover plate acts as a firm support for equipment inside the housing, as well as acting as a heat-sink for heat generated by electrical equipment. The metal plate also shields the environment from radio frequencies emitted from within the housing. The enclosure includes a plurality of outwardly-extending tubular projections through which cables can pass into the enclosure.

7 Claims, 4 Drawing Sheets

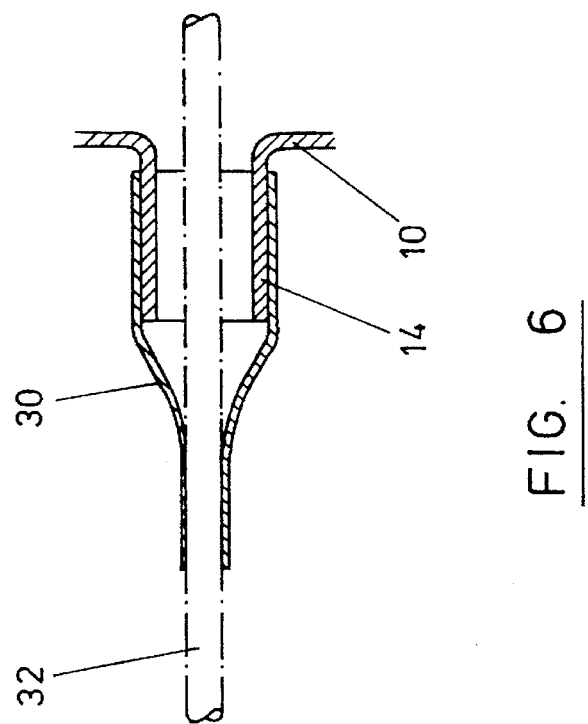
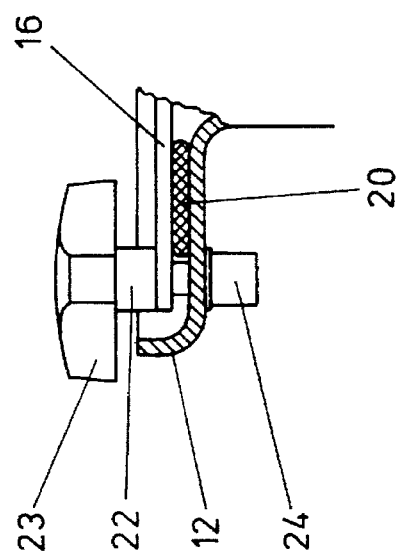
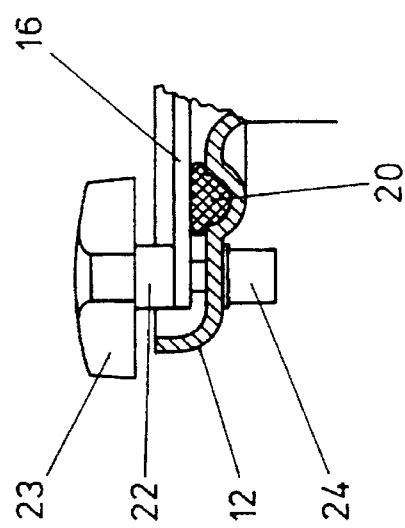

CABLE JOINTING ENCLOSURE

BACKGROUND OF THE INVENTION

This invention relates to a cable jointing enclosure for use underground.

There is a common need to interconnect telecommunications e.g. telephone cables on cable television lines with associated equipment. It is necessary to provide enclosures to protect cable splices or connectors and electrical and electronic equipment from moisture or foreign materials. Such enclosures are also used to provide protection to the external environment from radio frequency radiation generated by the equipment contained within the enclosures, and to dissipate unwanted heat generated by that equipment when in use. The enclosure may house one or more items of line equipment linked together by cable or other interface equipment. For example, the line equipment may include amplifiers, directional couplers, fibre optic splice organisers, copper cable splice termination blocks, and cable star and branch taps or blocks for fibre, copper and coaxial cable distribution to the premises of individual customers.

SUMMARY OF THE INVENTION

We have now devised a cable jointing enclosure which can be mounted underground yet provides effective sealing against the ingress of moisture or foreign substances.

In accordance with this invention, there is provided a cable jointing enclosure which comprises a one-piece housing formed by rotational moulding and having an opening in its top, and a metal plate for sealing over the opening in the top of the housing.

Preferably a side wall of the housing is formed with a plurality of outwardly-extending tubular projections through which cables can pass into the enclosure. In use, each of these is sealed by the application of a heat-shrink sleeve which is recovered at one of its ends onto the cable and at its other end onto the tubular projection. At least some of the tubular projections may be closed until needed for use.

Preferably the housing comprises a cross-linked polymer, which withstands the heat to which the tubular projections are subjected when applying the heat-shrink sleeves.

Preferably the metal cover plate is flat. Preferably the cover plate seats on a peripheral flange formed around the opening in the housing.

BRIEF DESCRIPTION OF THE DRAWING FIGURES

An embodiment of this invention will now be described by way of example only and with reference to the accompanying drawings, in which:

FIG. 4 is an enlarged section through a flange of the enclosure;

FIG. 5 is a similar section through a modified flange; and

FIG. 6 is a section through a cable port of the enclosure when a cable is fitted.

DETAILED DESCRIPTION OF THE DRAWINGS

Figure 1:
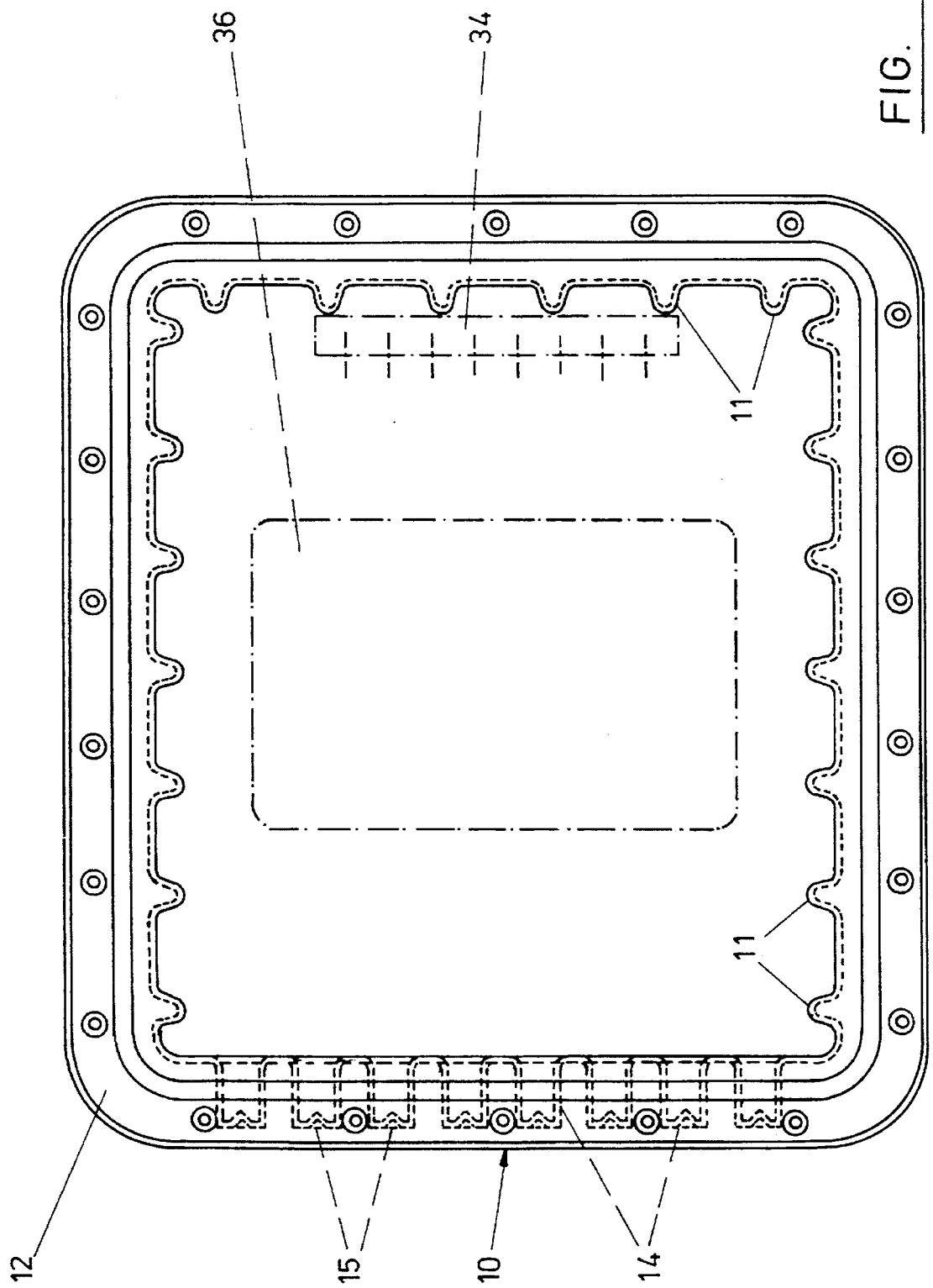
FIG. 1 is a top view of an enclosure in accordance with this invention, shown with its top cover plate removed.
Figure 2:
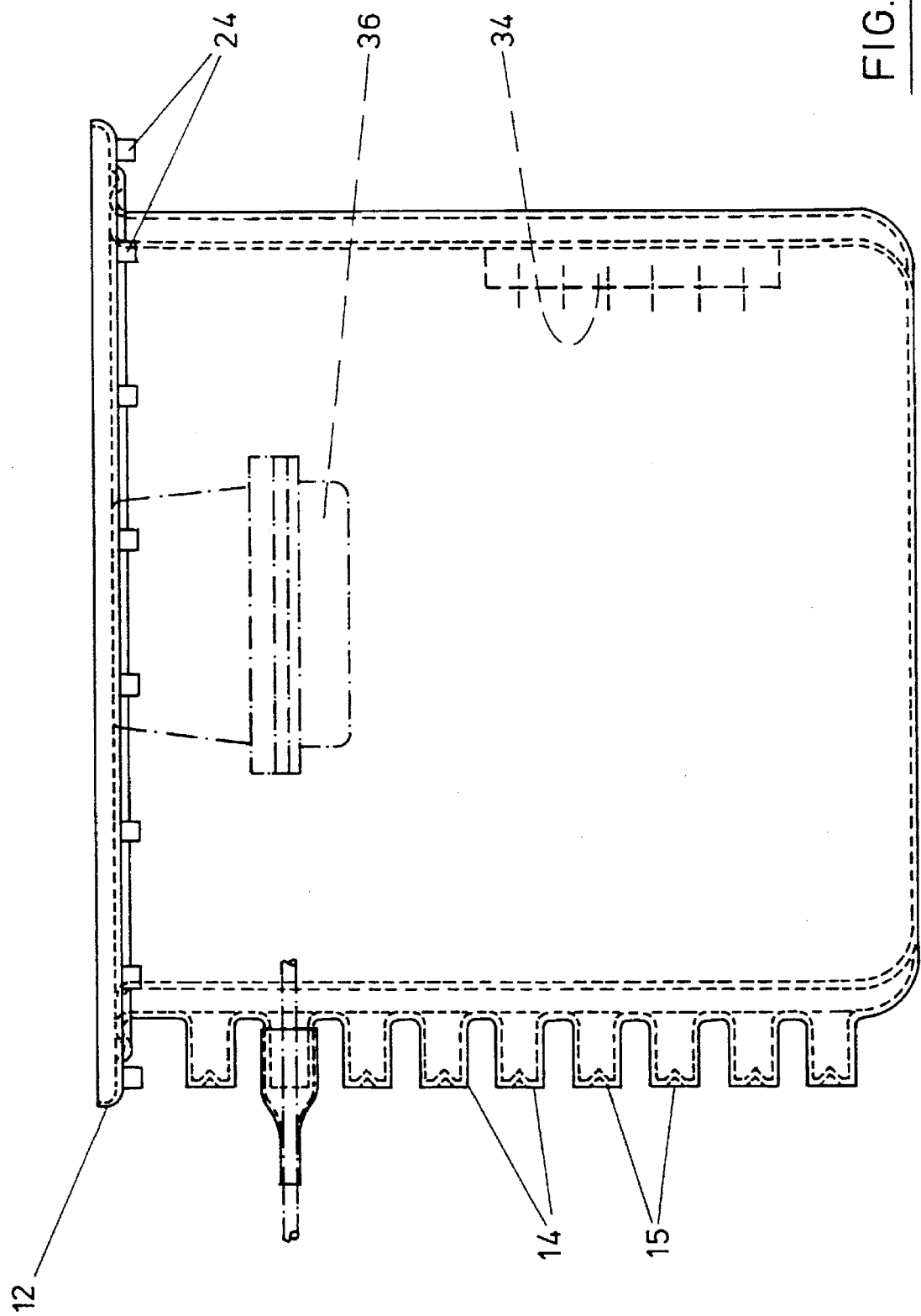
FIG. 2 is a vertical section through the enclosure.
Figure 3:
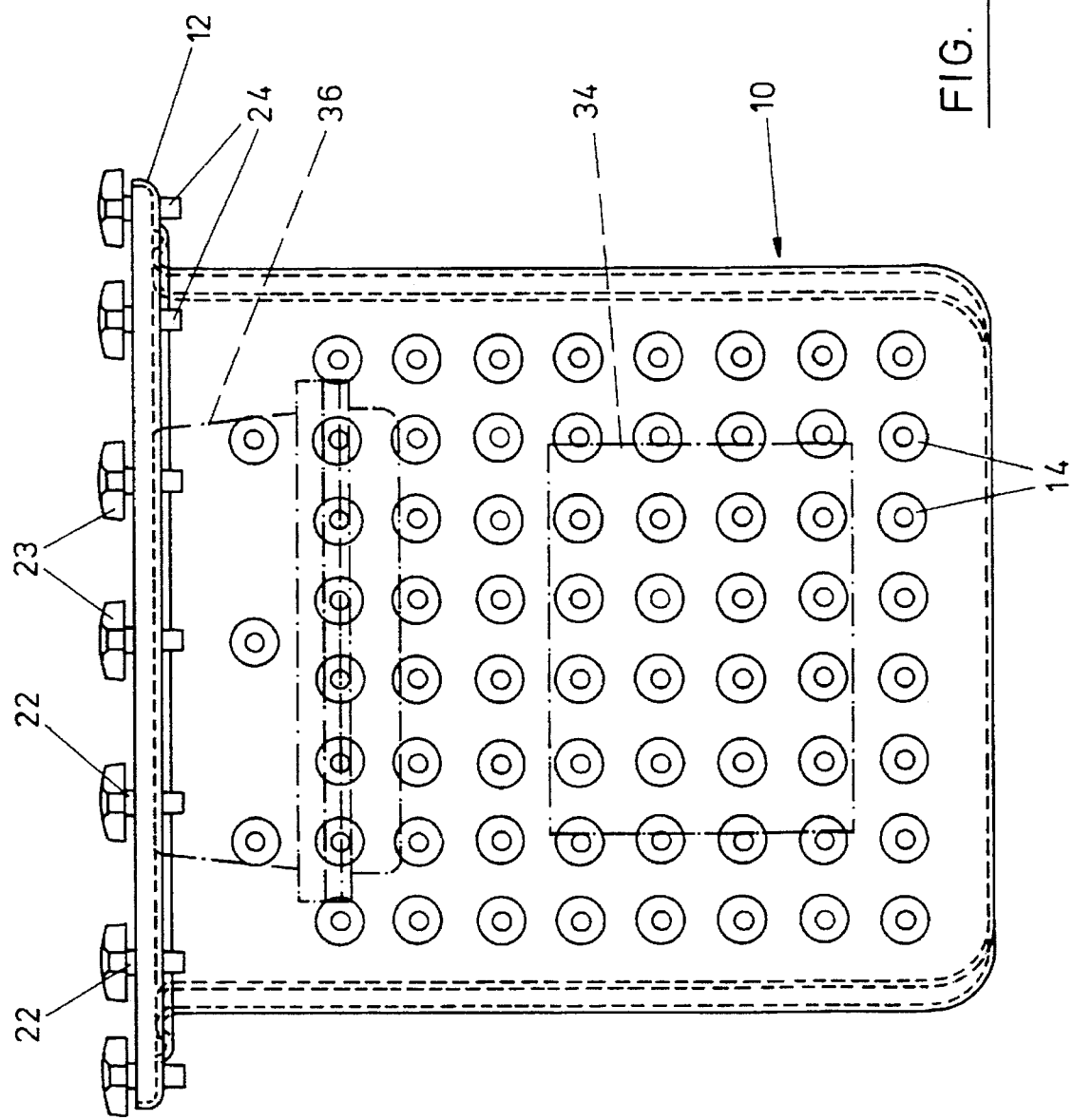
FIG. 3 is an end view of the enclosure with the top cover plate in position.

Referring to FIGS. 1 to 3 of the drawings, there is shown a cable jointing enclosure which comprises a one-piece housing 10 formed by rotational moulding. The housing 10 is generally rectangular in shape, with a bottom and four walls and an opening in its top. A peripheral flange 12 projects outwardly around this opening. The side walls of the housing may be ribbed as shown at 11. A plurality of tubular projections 14 extend outwardly from one side wall of the housing. At least some of these may be closed as shown at 15, in the as-moulded condition of the housing 10. A flat metal plate 16 fits over the opening in the top of the housing, resting on the peripheral flange 12 with the interposition of a peripheral seal 20. As shown in FIG. 4, this seal may be of flat section to fit between the flat plate 16 and a flat flange 12, or as shown in FIG. 5 the seal 20 may be of circular section to fit in a groove extending around the flange 12. The flat plate 16 is clamped in position by a series of bolts 22 which carry thumb wheels 23 and pass through the plate 16 and flange 12, outwardly of the seal 20, and screw into fixing elements 24 on the underside of the flange.

In use, the housing 10 can be installed underground. Cables are passed into the housing through the tubular projections 14 (once those needed have been opened). The cables are connected together or to equipment within the housing. As shown in FIG. 6, a bottle-shaped heat-shrink sleeve 30 is applied to each tubular projection 14 and cable e.g. 32 in order to seal the cable port.

In the example shown, the cables can be connected to a distribution unit at 34, which is in turn connected to an amplifier 36 mounted to the underside of the flat metal cover plate 16. Preferably the plate 16 is formed with holes through which bolts may be passed, for screwing into threaded bores in the body of the amplifier 36: each bolt is provided with a rubber ring seal which encircles the bolt and is compressed upon tightening the bolt, to seal the bolt holes in the plate 16. The plate 16 provides a firm support for the amplifier and also provides for effective heat dissipation. The metal plate 16 also acts as an electromagnetic shield to prevent interference generated by the equipment within the housing: in order to improve this, the interior surface of the housing 10 may be provided with a metal coating e.g. by spraying or electroplating, or a self-adhesive metal foil sheet may be applied to its inside surfaces.

Preferably the housing 10 comprises a cross-linked polymer, e.g. polyethylene, which is a stable material to withstand the temperatures to which its projections 14 are subjected when heat-shrinking the sleeves 30.

Manufacturing the housing 10 by rotational moulding enables its manufacture in cross-linked form in a relatively inexpensive manner.

I claim:

1. A jointing enclosure for telecommunications cables, comprising:

a one-piece plastic housing formed by rotational molding and having an opening in its top;

a metal cover plate for sealing over the opening in the top of said one-piece plastic housing;

a side wall of said housing being formed with a plurality of outwardly-extending tubular projections through which telecommunications cables are capable of being passed into said housing, at least one of the tubular projections being closed in an as-molded condition of said housing.

2. A cable jointing enclosure as claimed in claim 1 in which the housing comprises a cross-linked polymer.

3. A cable jointing enclosure according to claim 1 in which the metal cover plate is flat.

4. A cable jointing enclosure according to claim 1 in which the metal cover plate seats on a peripheral flange formed around the opening in the housing.

5. A cable jointing enclosure according to claim 1 in which the housing is rectangular in shape.

6. A cable jointing enclosure according to claim 1 in which an interior surface of the housing is provided with a metal coating or layer.

7. A cable jointing enclosure according to claim 1 in which the cover plate includes means for supporting an amplifier to its underside.

* * * * *